2,855,304

AQUEOUS AURIN CYANIDE SOLUTIONS AND SENSITIZING PROCESS

Lyman Chalkley, Prince Georges County, Md.

No Drawing. Application May 14, 1957
Serial No. 658,971

14 Claims. (Cl. 96—90)

This invention relates to aqueous aurin cyanide solutions and to processes utilizing such solutions for sensitizing sheet materials for photographic and other applications.

Aurin cyanide, 4,4',4" trihydroxy triphenylacetonitrile, is a colorless substance difficultly soluble in water which, upon exposure to radiant energy of a wave length below a maximum wave length of about 3000 Angstrom units, in the presence of a suitable activator such as gelatin or other hydrocolloids, develops a deep orange color. The alkaline salts of aurin cyanide, including the ammonium salt, on the other hand, are water soluble but are sensitive to higher maximum wave lengths, i. e., up to about 3150 Angstrom units. This difference in sensitivity is critical since it provides the difference between sensitivity and insensitivity in sunlight. Thus, the alkaline salts of aurin cyanide are sensitive to sunlight whereas the free phenol is relatively insensitive. Materials sensitized with the latter substance, therefore, require no special precautions to prevent accidental exposure. Accordingly, it is often desirable to sensitize paper or other materials so as to show the spectral sensitivity of aurin cyanide in the form of the free phenol and devoid of the longer wave length sensitivity of the alkaline salts.

As disclosed in my copending application Serial No. 542,479, paper or other sheet materials may be sensitized with dye cyanides by wetting such materials with a solution of the sensitizer in a suitable solvent and evaporating the solvent. Sensitizing solutions for this use may also contain colloids, sizes, buffers or other materials useful in the sensitized paper. Water or organic solvents, such as methyl or ethyl alcohol, acetonitrile, etc., may be used as solvents for certain of the dye cyanides, including the alkaline salts of aurin cyanide. The more difficultly water-soluble dye cyanides, including the free phenol form of aurin cyanide, have been restricted to use with organic solvents.

However, aqueous solvents have many advantages over the organic solvents. The latter are relatively expensive, are usually highly inflammable, and in some instances have a detrimental effect upon the rubber rollers of conventional coating apparatus. Moreover, the use of organic solvents is often undesirable because most of them strike through even well-sized material, with the result that the sheet is impregnated with the sensitizer. This condition may be undesirable for several reasons. In the first place, it is wasteful of sensitizer. Secondly, when the paper is printed the image shows on both sides, which may produce an objectionable appearance and renders the back of the print unsuitable for carrying notes or other use. Also, when the sensitizer is distributed through the body of the material, the printed image is more diffuse and less sharp than when the sensitizer is confined to the surface. Water solutions, on the other hand, may easily be confined to the surface of a properly sized material. With the water-soluble dye cyanides the foregoing problems are readily solved by using water as the solvent medium. But water alone is an unsatisfactory solvent for coating or impregnating solutions using aurin cyanide in the free phenol form because of the very slight solubility of this material in water. When water is mixed with enough organic solvent, such as alcohol, to afford a sufficiently great concentration of aurin cyanide for coating, the presence of the organic solvent causes the solution to penetrate even well-sized paper.

Accordingly, an object of the present invention is to provide an improved process, eliminating these difficulties, and effecting the coating or impregnating of carrier materials with an aurin cyanide sensitizer without the use of organic solvents to produce a photosensitive product which shows a spectral sensitivity only of the aurin cyanide free phenol.

Another object of the invention is to provide a method for coating sized carrier materials, such as sized paper, on a surface portion only with aurin cyanide solution.

Another object of the invention is to provide aqueous solutions of aurin cyanide which are useful in the preparation of sensitized sheet materials.

The invention depends upon the discovery that the solubility of aurin cyanide in water may be greatly increased by the addition of ammonia to the system, and that paper after coating with this solution and drying, shows photochemical properties, both as to spectral sensitivity and coloring of image, of only the aurin cyanide free phenol and not of its salts. The process, therefore, comprises dissolving aurin cyanide in an aqueous solution of ammonia, applying such solution to the surface of a carrier web, such as paper, and drying the coated surface. In specific modifications of this process, the carrier material may provide a photoactivator for the aurin cyanide, or the aqueous ammonia solution may contain a photoactivator compound. Thus, the cellulose constituent of paper provides a suitable activator for the aurin cyanide and use of other hydrocolloids, except for sizing, is optional, whereas with other base materials such as glass, nitrocellulose, or other plastics, a hydrocolloid activator should either be included in the sensitizer solution or applied as a separate coating solution. The sensitizing composition of the invention in its broad aspects is an aqueous ammonia solution containing aurin cyanide dissolved therein.

While it is preferred to use commercial ammonium hydroxide solution containing 28 to 29% $NH_3$ in water, less concentrated solutions may be used, if desired. For example, satisfactory results are obtained with 10% ammonia solution, although the solution rate is faster and greater amounts of aurin cyanide may be incorporated in the more concentrated ammonia solutions. In a preferred procedure, the aurin cyanide is first dissolved in a strong amonia solution and this is diluted with water to produce the aurin cyanide concentration desired. The final solution, for example, may contain from about 0.1% to about 10% by weight of aurin cyanide. Usually, a concentration of about 2 to 3% is ample for coating one side of a sized paper.

The invention will further be illustrated by the following examples of practice:

*Example I*

One gram of aurin cyanide, prepared, for example, by the method Caro and Graebe, Berichte der deutschen Chemischen Gesellschaft 11, 1116, is dissolved at room temperature in 20 ml of a 28% aqueous solution of ammonia. A clear 5% aurin cyanide solution is obtained. This solution may be utilized as a stock solution to be diluted as desired for application to materials to be photosensitized. Likewise, various hydrocolloids, sizes, buffers, or other materials may be incorporated in this stock solution.

Example II

One volume of the 5% aurin cyanide stock solution prepared as in Example I is diluted with one volume of water to provide a 2.5% solution. Paper that has been sized with gelatin is coated on one side by floating it upon the surface of the aurin cyanide solution for two minutes at 20° C. The resulting paper is air-dried. The dried paper is sensitive only on the coated surface and upon exposure to wave lengths shorter than about 3000 Angstrom units, prints out an orange image.

Instead of coating the surface of the sized paper by floating, it will be understood that the sensitizing solution may be applied in any conventional manner, such as by pouring, rolling or brushing it on to the paper. The gelatin with which the paper is sized plays the dual role of a photoactivator for the aurin cyanide in the photosensitive system and of preventing strike-through of the aqueous sensitizer solution. It may be replaced by other hydrocolloid sizes, such as starch, polyvinyl alcohol, hydroxyethyl cellulose, and the like. Alternatively or additionally, such materials may be added to the aurin cyanide solution applied to the paper. Where it is not necessary that the sensitizer solution be confined to the surface of the paper, the sizing material may be omitted, the cellulose of the unsized paper providing the necessary photoactivator for the aurin cyanide.

Example III

One volume of 5% aurin cyanide stock solution prepared as in Example I is diluted with one volume of water to provide a 2.5% solution. This solution is applied to one surface of a starch-sized paper to form a thin coating on one side thereof. The coated material is then dried by exposure to air. The resulting paper prints out an orange image on the sensitized side only, when exposed to wave lengths shorter than about 3000 Angstrom units.

Example IV

One volume of 2.5% aurin cyanide solution prepared as in Example III is applied to one surface of a paper which has previously been sized with a 10% solution of polyvinyl alcohol in water. The resulting coated paper is air-dried to provide sensitized strip material. This material prints out an orange image on the sensitized side only, upon exposure to wave lengths shorter than about 3000 Angstrom units.

It will be understood that unsized paper and other porous sheet materials may be impregnated with the aqueous ammonical aurin cyanide solutions to provide materials that are sensitive on both sides, the aqueous ammonia providing an improved solvent over the usually organic solvents from the standpoint of economy, reduction in fire hazard, etc.

I claim:

1. A composition for the preparation of photosensitive materials, comprising: an aqueous ammonia solution containing aurin cyanide dissolved therein.
2. A composition for the preparation of photosensitive materials, comprising: an aqueous ammonia solution containing from about 0.1 to about 10% aurin cyanide dissolved therein.
3. A composition for the preparation of photosensitive materials, comprising: an aqueous solution containing about 28 to 29% of $NH_3$ and about 5% of aurin cyanide dissolved therein.
4. A composition for the preparation of photosensitive materials, comprising: an aqueous ammonia solution containing aurin cyanide and a hydrocolloid dissolved therein.
5. A composition for the preparation of photosensitive materials, comprising: an aqueous ammonia solution containing aurin cyanide and gelatin dissolved therein.
6. A method for sensitizing sheet material, comprising: applying to one side thereof an aqueous ammonia solution containing aurin cyanide dissolved therein, and drying the resulting coated material.
7. A method for sensitizing paper comprising: applying an aqueous ammonia solution containing aurin cyanide dissolved therein to one side of said paper, and drying the resulting coated material.
8. A method for the preparation of a photosensitive material, comprising: applying to one side of a sized paper an aqueous ammonia solution containing aurin cyanide dissolved therein, and drying the resulting coated material.
9. A method for the preparation of photosensitive sheet materials, comprising: applying to one side of a gelatin-sized paper an aqueous ammonia solution containing aurin cyanide dissolved therein, and drying the coated surface at room temperature.
10. A method for the preparation of a photosensitive sheet material, comprising: applying to one side of a gelatin-sized paper an aqueous ammonia solution containing about 2 to 3% of aurin cyanide, and air-drying the resulting material.
11. A method for the preparation of a photosensitive material, comprising: applying to the surface of a supporting base an aqueous ammonia solution containing aurin cyanide.
12. A method for the preparation of a photosensitive material, comprising: applying to the surface of a supporting base an aqueous ammonia solution containing about 2 to 3% of aurin cyanide.
13. A method for the preparation of photosensitive materials, comprising: applying to one side of a starch-sized paper an aqueous ammonia solution containing aurin cyanide dissolved therein, and drying the coated surface at room temperature.
14. A method for the preparation of photosensitive materials, comprising: applying to one side of a polyvinyl alcohol-sized paper an aqueous ammonia solution containing aurin cyanide dissolved therein, and drying the coated surface at room temperature.

References Cited in the file of this patent

UNITED STATES PATENTS

| | | |
|---|---|---|
| 316,471 | Lowe | Apr. 28, 1885 |
| 2,441,561 | Chalkley | May 18, 1948 |
| 2,755,202 | Balon et al. | July 17, 1956 |